United States Patent [19]

Smith

[11] Patent Number: 5,532,699

[45] Date of Patent: Jul. 2, 1996

[54] NON-COHERENT RADAR SYSTEM HAVING IMPROVED RESOLUTION CAPABILITIES

[75] Inventor: Winthrop W. Smith, Greenville, Tex.

[73] Assignee: E-Systems, Inc., Dallas, Tex.

[21] Appl. No.: 480,616

[22] Filed: Jun. 7, 1995

Related U.S. Application Data

[63] Continuation of Ser. No. 307,469, Sep. 19, 1994, abandoned.

[51] Int. Cl.$^6$ ........................................ G01S 7/44
[52] U.S. Cl. ........................................ 342/195
[58] Field of Search ................ 342/195; 364/724.01

[56] References Cited

U.S. PATENT DOCUMENTS

| | | | |
|---|---|---|---|
| 3,643,257 | 2/1972 | Thomson et al. | 342/92 |
| 3,680,099 | 7/1972 | Herman et al. | 342/194 |
| 3,825,928 | 7/1974 | Williams | 342/158 |
| 4,112,430 | 9/1978 | Ladstatter | 342/196 |
| 4,283,767 | 8/1981 | Rountree | 367/901 |
| 4,471,357 | 9/1984 | Wu et al. | 342/196 |
| 4,684,950 | 8/1987 | Long | 342/94 |
| 4,707,697 | 11/1987 | Coulter et al. | 342/196 |
| 4,710,772 | 12/1987 | Cantwell et al. | 342/195 |
| 4,768,035 | 8/1988 | Thurber et al. | 342/194 |
| 4,804,962 | 2/1989 | Picquendar | 342/203 |
| 4,901,082 | 2/1990 | Schreiber et al. | 342/196 |
| 5,043,734 | 8/1991 | Niho | 342/195 |
| 5,059,966 | 10/1991 | Fujisaka et al. | 342/195 |
| 5,115,246 | 5/1992 | Thomas, Jr. et al. | 342/195 |
| 5,163,176 | 11/1992 | Flumerfelt et al. | 342/188 |
| 5,173,706 | 12/1992 | Urkowitz | 342/195 |

Primary Examiner—Daniel T. Pihulic
Attorney, Agent, or Firm—Harold E. Meier

[57] ABSTRACT

An improved receiver for a non-coherent radar system including a mixer, an intermediate frequency amplifier, an envelope detector and a sliding window integrator. The receiver further includes a circuit connected to the sliding window integrator for providing enhanced signal-to-clutter ratios and azimuth resolution. The circuit comprises a pair of cascaded inverse filters wherein the first inverse filter compensates for the filter response of the sliding window integrator, and the second inverse filter compensates for the filter response of the radar system antenna due to its gain pattern.

8 Claims, 2 Drawing Sheets

NON-COHERENT RADAR SYSTEM HAVING IMPROVED RESOLUTION CAPABILITIES

This application is a continuation of U.S. patent application Ser. No. 08/307,469, filed Sep. 19, 1994, now abandoned.

TECHNICAL FIELD

The present invention relates to non-coherent radar systems and, in particular, to apparatus and method for processing the return signal in the receiver of a non-coherent radar system to provide for improved signal-to-clutter ratios and azimuth resolution.

BACKGROUND OF THE INVENTION

Conventional non-coherent radar systems transmit pulses of radio frequency energy and receive echoes of energy reflected from objects (such as targets of interest and clutter) located in the path of the transmitted energy. The azimuth resolution of such radar systems is limited by the azimuth beamwidth of the radar antenna radiating the transmitted energy pulses. For example, a radar system with a one degree azimuth beamwidth possesses an azimuth resolution of roughly one mile at a range of sixty miles from the radar site. The azimuth resolution is further affected by the distance between the detected objects and the radar site because the size of the range azimuth cell increases with range. Thus, at points distant from the radar site, the range azimuth cell encompasses more unwanted objects (clutter) in with the detected targets of interest. This results in a low signal-to-clutter ratio that adversely affects the ability of the radar system to resolve targets of interest for detection.

The traditional solution to the foregoing drawbacks of conventional non-coherent radar systems has been to utilize a coherent radar system. Such coherent systems typically include Doppler beam sharpening or synthetic aperture processing to improve signal-to-clutter ratios and azimuth resolution. However, coherent radar systems are more complex and significantly more costly than conventional non-coherent systems. Accordingly, there exists a need for a method and apparatus for improving the signal-to-clutter ratio and azimuth resolution of conventional non-coherent radar systems.

SUMMARY OF THE INVENTION

In a conventional receiver for a non-coherent radar system, the radar return signal output by the radar antenna is mixed with a local oscillator signal, amplified in its intermediate frequency, detected with an envelope detector, amplified again and integrated to improve signal-to-noise ratio. The detected radar return signal output from the integrator is then further processed to facilitate human perception and recognition of any detected objects. Typically, this involves amplifying the signal for video display on a cathode ray tube in a particular format (for example, on a plan position indicator display).

The present invention utilizes a pair of inverse filters to perform additional signal processing on the radar return signal before display. The first inverse filter has a frequency response derived from the inverse of an estimation of the frequency response of the integrator. The second inverse filter has a frequency response derived from the inverse of an estimation of the frequency response of the radar system antenna caused by its gain pattern. These inverse filters function to improve the signal-to-clutter ratio and azimuth resolution of the radar system by providing a unity frequency response through the radar system receiver.

BRIEF DESCRIPTION OF THE DRAWINGS

A more complete understanding of the present invention may be had by reference to following Detailed Description when taken in conjunction with the accompanying Drawings wherein.

DETAILED DESCRIPTION OF THE DRAWINGS

Figure 1:
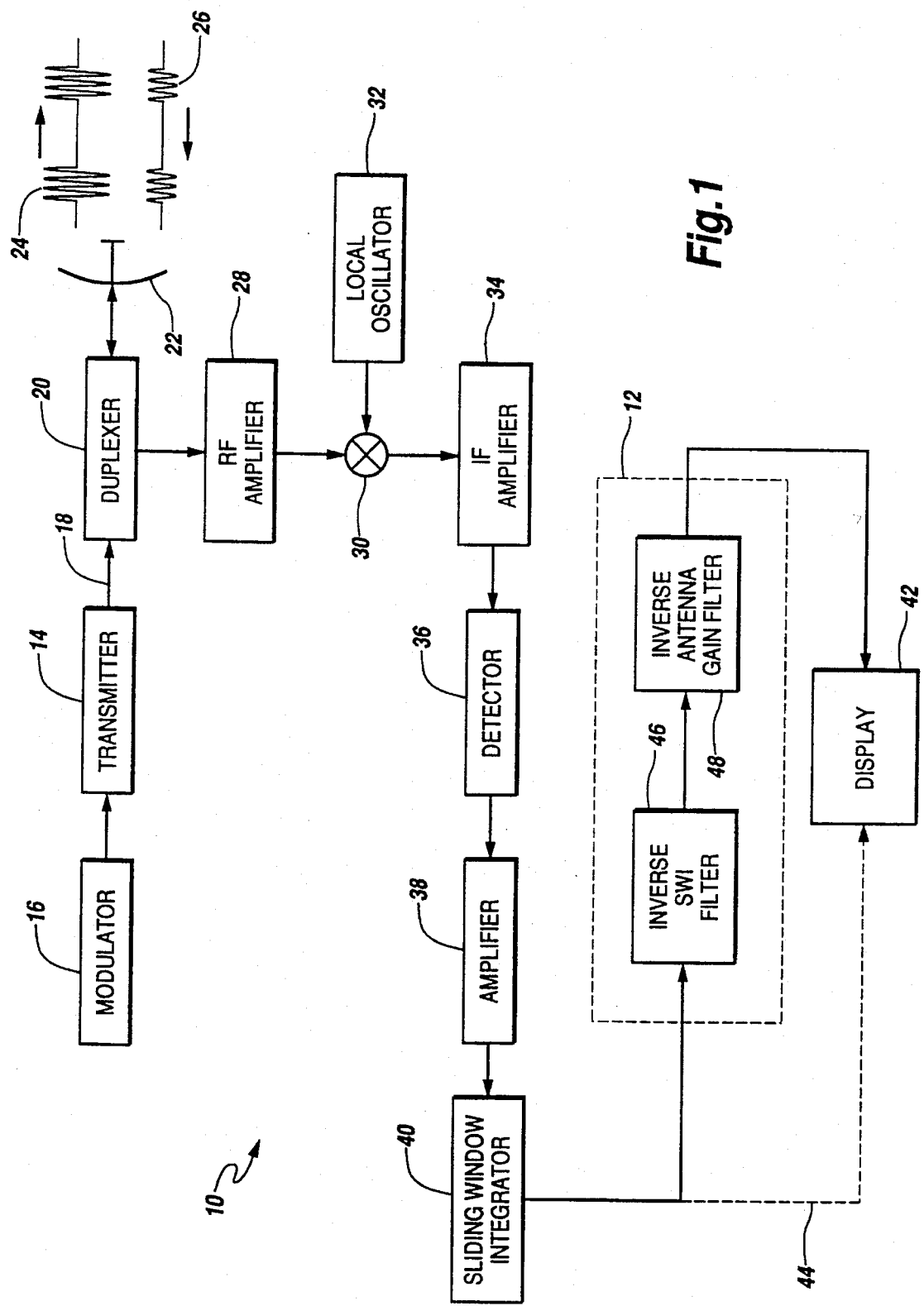
FIG. 1 is a block diagram of a non-coherent radar system including the increased azimuth resolution circuit of the present invention.

Referring now to FIG. 1, there is shown a block diagram of a conventional non-coherent radar system 10 including the increased azimuth resolution circuit 12 of the present invention. The radar system 10 includes a transmitter 14 for generating an amplified signal oscillating at a predetermined high frequency f. Operation of the transmitter 14 to produce the oscillating high frequency signal is controlled by a modulator 16 such that the transmitter repetitively outputs short duration pulses over line 18. Each pulse output from the transmitter 14 comprises several cycles of energy at the frequency f. The generated and output pulsed high frequency signal is passed by a duplexer 20 to an antenna 22 that radiates the energy of the pulsed signal into free space as a pulsed electromagnetic wave 24.

If the radiated pulsed electromagnetic wave 24 strikes and is reflected by an object in its path, a pulsed echo wave 26 of substantially less signal strength is generated. The pulsed echo wave 26 is received by the antenna 22 to produce a radar return signal that is passed by the duplexer 20 to a receiver for the radar system. The receiver includes a radio frequency amplifier 28 where the return signal is amplified and applied to the first input of a mixer 30. The second input of the mixer 30 receives the output of a local oscillator 32 generating a signal oscillating at a predetermined frequency $f+f_i$ (wherein the frequency $f_i$ is referred to as the "intermediate frequency".

At the output of the mixer 30 there appears an intermediate frequency radar return signal comprising a train of pulses with each pulse comprised of oscillations at the intermediate frequency $f_i$. The intermediate frequency radar return signal is amplified by an intermediate frequency (IF) amplifier 34, rectified and low pass filtered by an envelope detector 36, and further amplified by an amplifier 38. A sliding window integrator (SWI) 40 connected to the amplifier 38 then processes the detected and amplified radar return signal to improve the signal-to-noise ratio and output an integrated radar return signal for further processing.

In a conventional non-coherent radar system, the integrated radar return signal is next processed, as generally indicated by dotted line 44, by a display means 42 to provide a visual indication of any objects detected by the radar system. However, in the improved radar system 10 of the present invention, the integrated radar return signal is next further processed by the circuit 12 to improve the signal-to-clutter ratio and azimuth resolution performance of the system. The signal output from the increased azimuth resolution circuit 12 is then processed by the display means 42.

The frequency response of the antenna 22 due to its gain pattern and the frequency response of the sliding window integrator (SWI) 40 may be estimated from an analysis of an equivalent digital filter. It is this "filtering" of the echo wave and radar return signal by the operation of the antenna 22 and sliding window integrator 40, respectively, that adversely affects the signal-to-clutter ratio and azimuth resolution performance of a conventional non-coherent radar system. As will be discussed in more detail herein, the increased azimuth resolution circuit 12 of the present invention functions to compensate and correct for the adverse affects that the operation of the antenna and sliding window integrator have on the radar return.

Figure 2A:
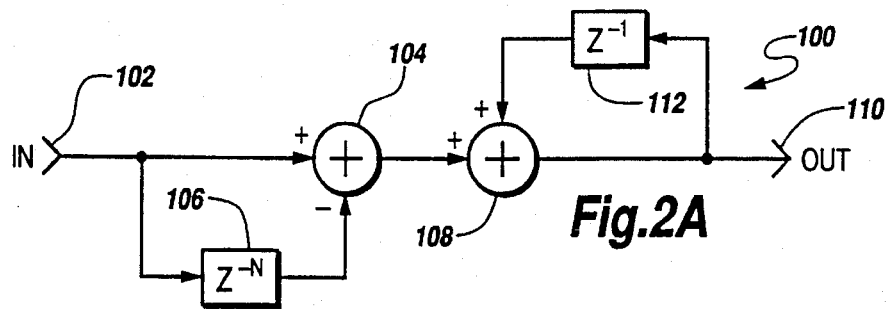
FIG. 2A is a block diagram of an equivalent filter for estimating the frequency response of the sliding window integrator shown in FIG. 1.

A block diagram of an equivalent filter 100 for estimating the frequency response of the sliding window integrator 40 is shown in FIG. 2A. The equivalent filter 100 includes an input port 102 connected to the first input of a first summer 104 and to an N inter-pulse time period delay 106. The variable N refers to the number of pulses in the electromagnetic wave 24 that are reflected by an object at a fixed location in free space as the antenna 22 of the radar system 10 scans the radar beam across the object. It will, of course, be understood that the value of N will change with any change in the rate with which the antenna beam scans. The output of the delay 106 is connected to the second input of the first summer 104 for subtraction from the signal received at the first input. The first summer 104 includes an output connected to a first input of a second summer 108 having an output connected to an output port 110 for the filter 100 and to a one inter-pulse time period delay 112. The output of the delay 112 is connected to the second input of the second summer 108 for addition to the signal received at the first input.

Figure 3A:
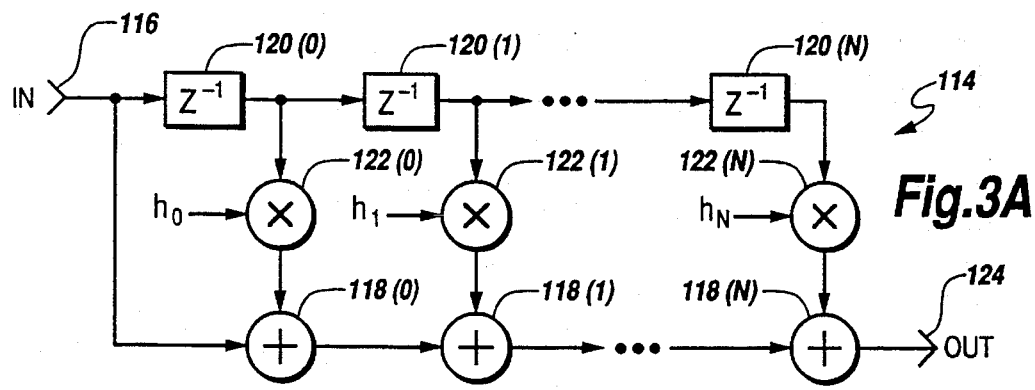
FIG. 3A is a block diagram of an equivalent filter for estimating the gain pattern frequency response of the radar system antenna shown in FIG. 1.

A block diagram of an equivalent finite impulse response (FIR) filter 114 for estimating the frequency response of the antenna 22 due to its known gain pattern is shown in FIG. 3A. The equivalent filter 114 includes an input port 116 connected to a first input of a summer 118(0) and to a one inter-pulse time period delay 120(0). The delay 120(0) includes an output connected to a subsequent one inter-pulse time period delay 120(1) and to a multiplier 122(0) for multiplication by a coefficient $h_0$. The output of the multiplier 122(0) is connected to the second input of the summer 118(0), with the summer 118(0) having an output connected to the first input of a subsequent summer 118 (1). The foregoing interconnection of summers 118, delays 120 and multipliers 122 repeats across the filter 114 for N stages (where N has the same numerical value as in the equivalent filter 100 of FIG. 2A), with the output of the final summer 118(N) connected to an output port 124 of the filter 114. The coefficients $h_0$ through $h_N$ are gain pattern coefficients and refer to the gain of the antenna 22 in reference to individual pulses N as the antenna beam scans across the fixed object. These gain pattern coefficients are calculated by, and may be obtained from the manufacturer of the antenna 22 used in the radar system 10.

Referring again to FIG. 1, the increased azimuth resolution circuit 12 of the present invention includes a pair of inverse filters for performing correction signal processing on the integrated radar return signal output from the sliding window integrator 40. The inverse filters are designed to function in combination with an equivalent non-inverse filter function to provide for a unity combined filter response to a input signal. In the present invention, the pair of inverse filters of the circuit 12 substantially corrects for any adverse affects resulting from the "filtering" of the radar return signal by the antenna 22 and sliding window integrator 40.

The circuit 12 comprises an inverse sliding window integrator (SWI) filter 46 having a filtering function derived from the frequency response of the sliding window integrator 40 as estimated from an evaluation of the equivalent filter 100 of FIG. 2A. The derivation is premised on the following: the convolution of the unit pulse response $g(n)$ for the inverse filter with the unit pulse response $h(n)$ of the non-inverse filter comprises a unit pulse (delta $(n)$). In equation form, that is:

$$delta(n) = h(n) * g(n),$$

wherein: delta(n) is one at n=0, and zero for n>0.

In the present case, the convolution of the unit pulse response of the inverse sliding window integrator filter 46 with the unit pulse response of the equivalent filter 100 comprises a unit pulse.

In the evaluation of the equivalent filter 100 to estimate the response of the sliding window integrator 40, $h(n)=1$. Therefore, in order to satisfy the equation:

$g(o)=1$ $g(1)=-g(o)=-1$ $g(2)=-g(o)-g(1)=0$ $g(3)=-g(0)-g(1)-g(2)=0$

As n increases, the result continues to be zero until $g(N-1)$. After that point there are no longer entries in the matrix for more $h(n)$ and the sequence will repeat. From this evaluation the circuit for the inverse sliding window integrator filter 46 is shown by a block diagram in FIG. 2B. The inverse sliding window integrator filter 46 in combination with the filtering effects of the sliding window integrator 40 result in a substantially unitary response to the radar return signal.

Figure 2B:
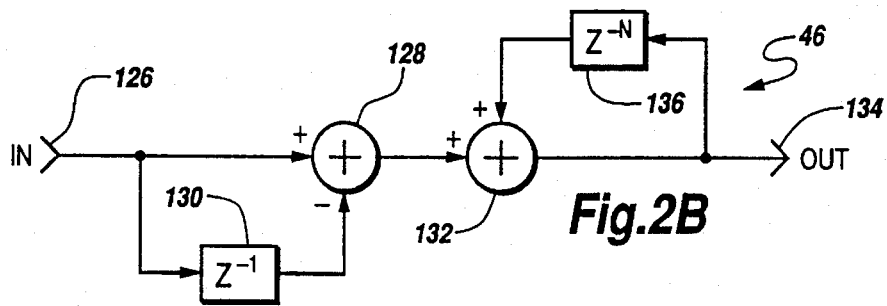
FIG. 2B is a block diagram of an inverse sliding window integrator filter.

Referring to FIG. 2B, the filter 46 includes an input port 126 connected to the first input of a first summer 128 and to a one inter-pulse time period delay 130. The output of the delay 130 is then connected to the second input of the first summer 128 for subtraction from the signal received at the first input. The first summer 128 includes an output connected to a first input of a second summer 132 having an output connected to an output port 134 for the filter 46 and to an N inter-pulse time period delay 136 (where N has the same numerical value as in the equivalent filter 100 of FIG. 2A). The output of the delay 136 is connected to the second input of the second summer 132 for addition to the signal received at the first input. Circuit 12 further comprises an inverse antenna gain pattern filter 48. This inverse filter is derived from an evaluation of the frequency response of the equivalent FIR filter 114 shown in FIG. 3A. In the instant case, the convolution of the unit pulse response of the inverse antenna gain filter 48 with the unit pulse response of the equivalent filter 114 comprises a unit pulse.

The equation delta(n)=h(n)* g(n) can be written in matrix form as follows:

$$
\begin{bmatrix} 1 \\ 0 \\ \cdot \\ \cdot \\ 0 \\ 0 \\ 0 \\ 0 \end{bmatrix} = \begin{bmatrix} h(N) & 0 & 0 & \ldots & 0 \\ h(N-1) & h(N) & 0 & \ldots & 0 \\ \cdot & & & \ldots & \\ \cdot & & & \ldots & \\ h(0) & & & \ldots & \\ 0 & h(0) & & \ldots & \\ 0 & 0 & h(0) & \ldots & \\ 0 & 0 & 0 & \ldots & h(0) \end{bmatrix} * \begin{bmatrix} g(0) \\ g(1) \\ \cdot \\ \cdot \\ \cdot \\ \cdot \\ \cdot \\ g(M) \end{bmatrix}
$$

wherein: N=the length of the unit pulse response of h(n); and M=the length of the unit pulse response of g(n).

The number of rows in the matrix is (M+1)+(N+1)−1.

Figure 3B:
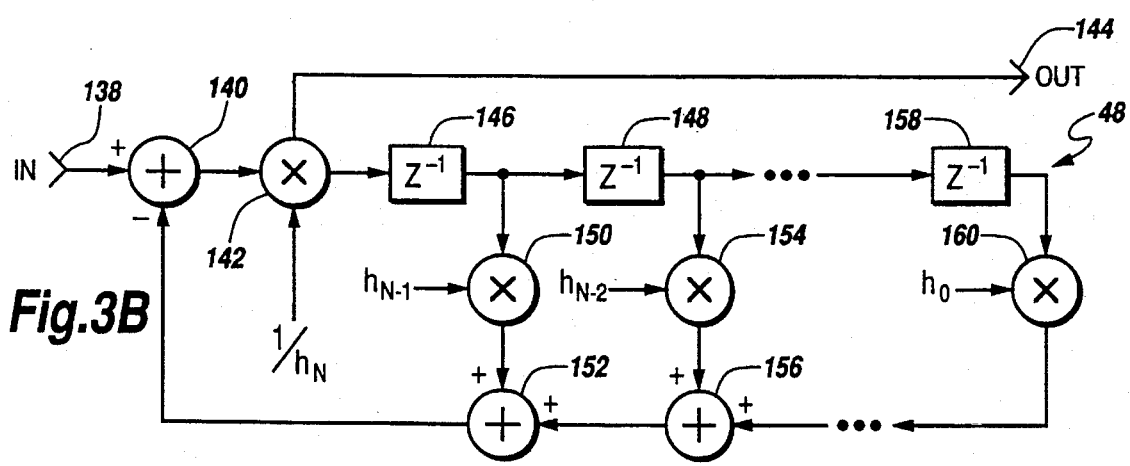
FIG. 3B is a block diagram of an inverse antenna gain filter.

The matrix equation is solved iteratively for g(n) in the unit pulse response of the inverse filter as follows:

Row 1: 1=h(N)g(0); which implies g(0)=1/h(N);

Row 2: 0=h(N−1)g(0)+h(N)g(1); which implies g(1)=−h(N−1)g(0)/h(N) =−h(N−1)/(h(N))$^2$ This process is continued for the following rows of the matrix. Examination of the results of the iterative solution reveals that the unit pulse response may be implemented as a feedback filter as shown in FIG. 3B with feedback coefficients of −h(N−i) out of an "ith" delay register. The inverse antenna gain pattern filter 48 in combination with the filtering effects of the antenna 22 results in a substantially unitary response to the radar return signal.

Referring to FIG. 3B, the filter 48 includes an input port 138 connected to a first input of a summer 140 having an output connected to the first input of a multiplier 142 for multiplication by a coefficient 1/$h_N$. The output of the multiplier 142 is connected to an output port 144 for the filter 48 and to a one inter-pulse time period delay 146. The output of the delay 146 is connected to a subsequent one inter-pulse time period delay 148 and to a multiplier 150 for multiplication by a coefficient $h_{N-1}$. The multiplier 150 includes an output connected to the first input of a summer 152 whose output is connected to the second input of the summer 140 for subtraction from the signal received at the input port 138. The output of delay 148 is connected to a Subsequent one inter-pulse time period delay (not shown; in a subsequent stage) and to a multiplier 154 for multiplication by a coefficient $h_{N-2}$. The multiplier 154 is then connected at its output to the first input of a summer 156 whose output is connected to the second input of the summer 152. The second input of the summer 156 is connected to a subsequent summer (not shown) for a subsequent filter stage providing multiplication by the coefficient $h_{N-3}$. The foregoing interconnection of delays, multipliers and summers repeats until a final stage is reached. In the final stage, a one inter-pulse time period delay 158 receives an input from a prior delay (not shown; in a preceding stage), and has an output connected to a multiplier 160 for multiplication by a coefficient $h_0$. The output of the multiplier 160 is connected to the second input of a prior summer (not shown) for the preceding filter stage providing multiplication by the coefficient $h_1$. The coefficients $h_0$ through $h_N$ are the same coefficients as in the equivalent filter 114 of FIG. 3A, and N has the same numerical value as in the equivalent filter 100 of FIG. 2A.

The inverse filters 46 and 48 utilized in the circuit 12 are characterized by transfer functions having multiple poles located on the unit circle.

Figure 4:
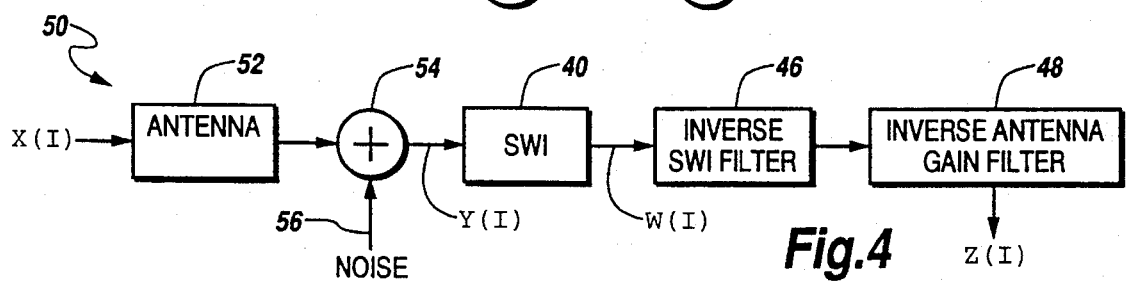
FIG. 4 is an equivalent circuit block diagram illustrating the signal processing of a non-coherent radar system including the increased azimuth resolution circuit of the present invention.

Reference is now made to FIG. 4 wherein there is shown an equivalent circuit block diagram illustrating the signal processing of a receiver for a non-coherent radar system 50 incorporating the increased azimuth resolution circuit 12 of the present invention. The system 50 receives a signal X(I) representative of the detection of objects (including targets of interest and clutter) by the radar system. An antenna 52 processes the signal X(I) and outputs a signal to the first input of a summer 54. The second input of the summer receives a noise input on line 56. At the output of the summer 54 there appears a radar return signal Y(I) representative of the noise contaminated output of the antenna as the radar system scans across the targets of interest and surrounding clutter. The signal Y(I) is processed by a sliding window integrator 40 to enhance the signal-to-noise ratio of the targets of interest. The signal W(I) is then processed by the circuit 12 through an inverse sliding window integrator 46 and inverse antenna gain filter 48 to output a signal Z(I).

A computer program for testing the effectiveness of the increased azimuth resolution circuit 12 of the present invention in providing enhanced signal-to-clutter ratios and azimuth resolution in a non-coherent radar system using the equivalent circuit block diagram shown in FIG. 4 includes instructions as follows:

```
10   DIM X(300), Y(300), Z(300), Q(300), W(300)
15   INPUT "NOISE LEVEL = ",N
20   FOR I=60 TO 300
30   X(I)=2*RND(1):Y(I)=0:Z(I)=0
40   NEXT I
50   X(180)=10:X(183)=11
60   FOR I = 60 TO 300
80   FOR J=1 TO 59
90   Y(I)=Y(I)+X(I−J+1)*(SIN(J*.0523598))
100  NEXT J
110  Y(I)=Y(I)+N*(RND(1)−.5):QR=0
120  RR=Y(I)−Y(I−40):W(I)=RR+W(I−1)
150  PP=W(I)−W(I−1):Q(I)=PP+Q(I−40)
170  FOR K=2 TO 59
180  QR=QR−Z(I−K+1)*((SIN(K*.0523598)/SIN(.0523598)))
190  NEXT K
200  Z(I)=QR+Q(I)/((SIN(.0523598)))
205  E=INT(1000*X(I)+.5):F=INT(1000*Y(I)+.5):
     WW=INT(1000*W(I)+.5):G=INT(1000*Z(I)+.5)
207  IF I<150 THEN GOTO 220
210  LPRINT I,E,F,WW,G
220  NEXT I
```

At instruction "50", the detected targets of interest are programmed into signal X(I) 3/60ths of a beamwidth apart for data points I=180 and I=183, and the detected clutter is given a random value at instruction "30". The gain pattern of the antenna 52 is selected, as shown at instruction "90" to be the positive lobe of a sine wave A noise level (determined at instruction "15") is added to the radar return signal at instruction "110" to generate the signal Y(I). Processing of the radar return signal by the sliding window integrator 40 is shown at instruction "120" to generate original W(I). Processing of the radar return signal by the inverse sliding window integrator 46 is shown at instruction "150" and processing of the radar return signal by the inverse antenna gain pattern filter 48 is shown at instructions "170", "180", "190" and "200" to generate output signal Z(I). The results of the execution of the foregoing computer instructions for a radar return signal including clutter plus two targets of interest, but no noise input (N=0), are set forth in Table 1 for the data points around the targets of interest (marked with an asterisk).

TABLE 1

| Data Points I | Signal X(I) | Signal Y(I) | Signal W(I) | Signal Z(I) |
|---|---|---|---|---|
| 175 | 423 | 36945 | 1513899 | 428 |
| 176 | 878 | 36929 | 1511923 | 871 |
| 177 | 1797 | 36981 | 1510126 | 1803 |
| 178 | 1562 | 37111 | 1508563 | 1558 |
| 179 | 577 | 37197 | 1507148 | 578 |
| 180* | 10000 | 37758 | 1506338 | 9998 |
| 181 | 334 | 38283 | 1506124 | 337 |
| 182 | 1981 | 38821 | 1506539 | 1982 |
| 183* | 11000 | 39879 | 1508086 | 10996 |
| 184 | 813 | 40934 | 1510757 | 814 |
| 185 | 1456 | 41971 | 1514513 | 1457 |
| 186 | 1185 | 42990 | 1519364 | 1187 |
| 187 | 899 | 43964 | 1525239 | 899 |
| 188 | 1430 | 44952 | 1532190 | 1428 |
| 189 | 1695 | 45990 | 1540203 | 1697 |
| 190 | 704 | 46952 | 1549239 | 701 |

Table 1 shows that it is difficult to resolve the two targets by examining the values of the signals Y(I) and W(I) output from the summer 54 and sliding window integrator 40, respectively. However, after processing the radar return signal W(I) through the increased azimuth resolution circuit 12 of the present invention the targets of interest are clearly resolved and detected as shown by the values of signal Z(I).

The results of the execution of the foregoing computer instructions for a radar return signal including clutter plus two targets of interest, and a noise input characterized by a high signal-to-noise ratio (N=0.1), are set forth in Table 2 for the data points around the targets of interest (marked with an asterisk):

TABLE 2

| Data Points I | Signal X(I) | Signal Y(I) | Signal W(I) | Signal Z(I) |
|---|---|---|---|---|
| 175 | 423 | 36930 | 1514214 | −264 |
| 176 | 878 | 36939 | 1512246 | 1761 |
| 177 | 1797 | 36978 | 1510408 | 2662 |
| 178 | 1562 | 37153 | 1508876 | −120 |
| 179 | 577 | 37202 | 1507491 | 958 |
| 180* | 10000 | 37721 | 1506672 | 9289 |
| 181 | 334 | 38301 | 1506494 | 2378 |
| 182 | 1981 | 38782 | 1506829 | −438 |
| 183* | 11000 | 39910 | 1508371 | 14422 |
| 184 | 813 | 40899 | 1511044 | −3234 |
| 185 | 1456 | 41967 | 1514788 | 4923 |
| 186 | 1185 | 42992 | 1519643 | 93 |
| 187 | 899 | 43969 | 1525555 | −358 |
| 188 | 1430 | 44922 | 1532497 | 2104 |
| 189 | 1695 | 46008 | 1540483 | 1799 |
| 190 | 704 | 46985 | 1549512 | 2104 |

Table 2 also shows that is difficult to resolve the two targets by examining the values of the signals Y(I) and W(I). However, inverse filtering of the radar return signal resolves the targets of interest in spite of the presence of some noise in the system.

The results of the execution of the foregoing computer instructions for a radar return signal that includes clutter plus two targets of interest, and a noise input characterized by a low signal-to-noise ratio (N=1), are set forth in Table 3 for the data points around the targets of interest (marked with an asterisk):

TABLE 3

| Data Points I | Signal X(I) | Signal Y(I) | Signal W(I) | Signal Z(I) |
|---|---|---|---|---|
| 175 | 423 | 36789 | 1517059 | −6427 |
| 176 | 878 | 37024 | 1515153 | 9680 |
| 177 | 1797 | 36946 | 1512950 | 10457 |
| 178 | 1562 | 37530 | 1511695 | −15256 |
| 179 | 577 | 37244 | 1510585 | 4405 |
| 180* | 10000 | 37387 | 1509672 | 2885 |
| 181 | 334 | 38458 | 1509829 | 20755 |
| 182 | 1981 | 38425 | 1509446 | −22224 |
| 183* | 11000 | 40189 | 1510937 | 45247 |
| 184 | 813 | 40581 | 1513630 | −39667 |
| 185 | 1456 | 41924 | 1517263 | 36118 |
| 186 | 1185 | 43011 | 1522155 | −9736 |
| 187 | 899 | 44013 | 1528401 | −11688 |
| 188 | 1430 | 44659 | 1535255 | 8213 |
| 189 | 1695 | 46176 | 1543009 | 2714 |
| 190 | 704 | 47279 | 1551966 | 14700 |

In this instance, it is difficult to resolve the two targets by examining the values of any of the output signals Y(I), W(I) or Z(I).

The difficulty in resolving the targets of interest after inverse filtering by the circuit 12 for a low signal-to-noise ratio (Table 3) can be attributed to the fact that the poles of the transfer functions for the inverse filters in the circuit 12 are close to the unit circle. The noise input is therefore amplified dramatically by the inverse filters precluding a resolution and identification of the targets of interest. Accordingly, the inverse filters for the increased azimuth resolution circuit 12 of the present invention are designed such that the location of the poles of the transfer functions for the filters will accommodate the signal-to-noise ratios anticipated during operation of the non-coherent radar system 10.

Although a preferred embodiment of the invention has been illustrated in the accompanying Drawings and described in the foregoing Detailed Description, it will be understood that the invention is not limited to the embodiment disclosed but is capable of numerous rearrangements and modifications of parts and elements without departing from the scope of the invention set forth and defined by the following claims.

I claim:

1. A filter circuit for the receiver of a radar system having an antenna with a known gain pattern, the receiver processing a radar return signal, comprising:

an inverse filter receiving the radar return signal, said filter having a filter response substantially the inverse of a response for the antenna due to its known gain pattern.

2. A filter circuit in accordance with claim 1 further comprising means for connecting the inverse filter to an output of a sliding window integrator.

3. A filter circuit in accordance with claim 1 wherein the inverse filter has a response substantially the inverse of the filter response of the antenna for the radar system.

4. A filter circuit in accordance with claim 1 wherein the inverse filter comprises an inverse finite impulse response (FIR) filter.

5. A filter circuit for the receiver of a radar system, the receiver processing a radar return signal and including a sliding window integrator, comprising:

an inverse filter receiving the radar return signal, said filter having a filter response substantially the inverse of a response for the sliding window integrator.

6. A filter circuit in accordance with claim 5 further comprising means for connecting the inverse filter to an output of the sliding window integrator.

7. A filter circuit in accordance with claim 5 wherein the inverse filter has a response substantially the inverse of the filter response of the sliding window integrator.

8. A filter circuit in accordance with claim 5 wherein the inverse filter comprises:

a first delay circuit for receiving the radar return signal and outputting a first delayed signal, said first delay circuit having a one inter-pulse time period delay;

a first summer for subtracting the first delayed signal from the radar return signal and producing an intermediate signal;

a second summer for adding the intermediate signal to a second delayed signal and outputting an inverse filtered radar return signal; and a second delay circuit for receiving the inverse filtered radar return signal and outputting the second delayed signal, said second delay circuit having a variable inter-pulse time period delay depending on the number of reflected pulses in the radar return signal caused by an object as the radar system scans the object.

* * * * *

UNITED STATES PATENT AND TRADEMARK OFFICE
CERTIFICATE OF CORRECTION

PATENT NO. : 5,532,699
DATED : July 2, 1996
INVENTOR(S) : Winthrop W. Smith

It is certified that error appears in the above-indentified patent and that said Letters Patent is hereby corrected as shown below:

Column 4, lines 32-35, "o" should be --0--.

Column 5, lines 19-20, minus sign "-" should be before "h", --  -h(N-1)--.

Column 5, line 42, "Subsequent" should be --subsequent--.

Column 6, line 61, " "200" to" should be --"200", to--.

Column 6, line 58, " "150" and " should be --"150", and--.

Column 6, line 61, "The results" should be start of new paragraph.

Column 6, line 67, "asterisk)." should be --asterisk):--.

Signed and Sealed this

Fifth Day of November, 1996

*Attest:*

BRUCE LEHMAN

*Attesting Officer*        *Commissioner of Patents and Trademarks*